(12) United States Patent
Guerinoni et al.

(10) Patent No.: US 12,292,286 B2
(45) Date of Patent: May 6, 2025

(54) MICROELECTROMECHANICAL GYROSCOPE AND METHOD FOR COMPENSATING AN OUTPUT THERMAL DRIFT IN A MICROELECTROMECHANICAL GYROSCOPE

(71) Applicant: STMICROELECTRONICS S.r.l., Agrate Brianza (IT)

(72) Inventors: Luca Guerinoni, Alzano Lombardo (IT); Luca Giuseppe Falorni, Limbiate (IT)

(73) Assignee: STMICROELECTRONICS S.r.l., Agrate Brianza (IT)

(*) Notice: Subject to any disclaimer, the term of this patent is extended or adjusted under 35 U.S.C. 154(b) by 32 days.

(21) Appl. No.: 18/353,692

(22) Filed: Jul. 17, 2023

(65) Prior Publication Data

US 2023/0358540 A1 Nov. 9, 2023

Related U.S. Application Data

(63) Continuation of application No. 17/524,609, filed on Nov. 11, 2021, now Pat. No. 11,740,088.

(30) Foreign Application Priority Data

Nov. 27, 2020 (IT) .................. 102020000028757

(51) Int. Cl.
*G01C 25/00* (2006.01)
*G01C 19/5712* (2012.01)

(52) U.S. Cl.
CPC ....... *G01C 19/5712* (2013.01); *G01C 25/005* (2013.01)

(58) Field of Classification Search
CPC .............. G01C 19/5712; G01C 25/005; G01C 19/5776; G01C 19/5755
See application file for complete search history.

(56) References Cited

U.S. PATENT DOCUMENTS

| | | |
|---|---|---|
| 2012/0118062 A1 | 5/2012 | Gunthner et al. |
| 2015/0268060 A1 | 9/2015 | Coronato et al. |
| 2017/0030741 A1 | 2/2017 | Lin et al. |
| 2017/0138734 A1 | 5/2017 | Shao |
| 2018/0252526 A1 | 9/2018 | Geisberger |
| 2018/0342667 A1 | 11/2018 | Kuisma |

(Continued)

FOREIGN PATENT DOCUMENTS

| | | |
|---|---|---|
| CN | 102042829 A | 5/2011 |
| CN | 108663037 A | 10/2018 |

(Continued)

*Primary Examiner* — David J Bolduc
(74) *Attorney, Agent, or Firm* — Seed IP Law Group LLP

(57) ABSTRACT

A microelectromechanical gyroscope includes: the support structure; a sensing mass, coupled to the support structure with degrees of freedom along a driving direction and a sensing direction perpendicular to each other; and a calibration structure facing the sensing mass and separated from the sensing mass by a gap having an average width, the calibration structure being movable with respect to the sensing mass so that displacements of the calibration structure cause variations in the average width of the gap. A calibration actuator controls a relative position of the calibration structure with respect to the sensing mass and the average width of the gap.

20 Claims, 9 Drawing Sheets

(56) References Cited

U.S. PATENT DOCUMENTS

| | | |
|---|---|---|
| 2020/0263990 A1 | 8/2020 | Kuisma et al. |
| 2021/0088545 A1 | 3/2021 | Tang |
| 2022/0170745 A1 | 6/2022 | Guerinoni et al. |

FOREIGN PATENT DOCUMENTS

| | | |
|---|---|---|
| CN | 216869584 U | 7/2022 |
| KR | 20140128040 A | 11/2014 |
| WO | WO 2011131690 A1 | 10/2011 |

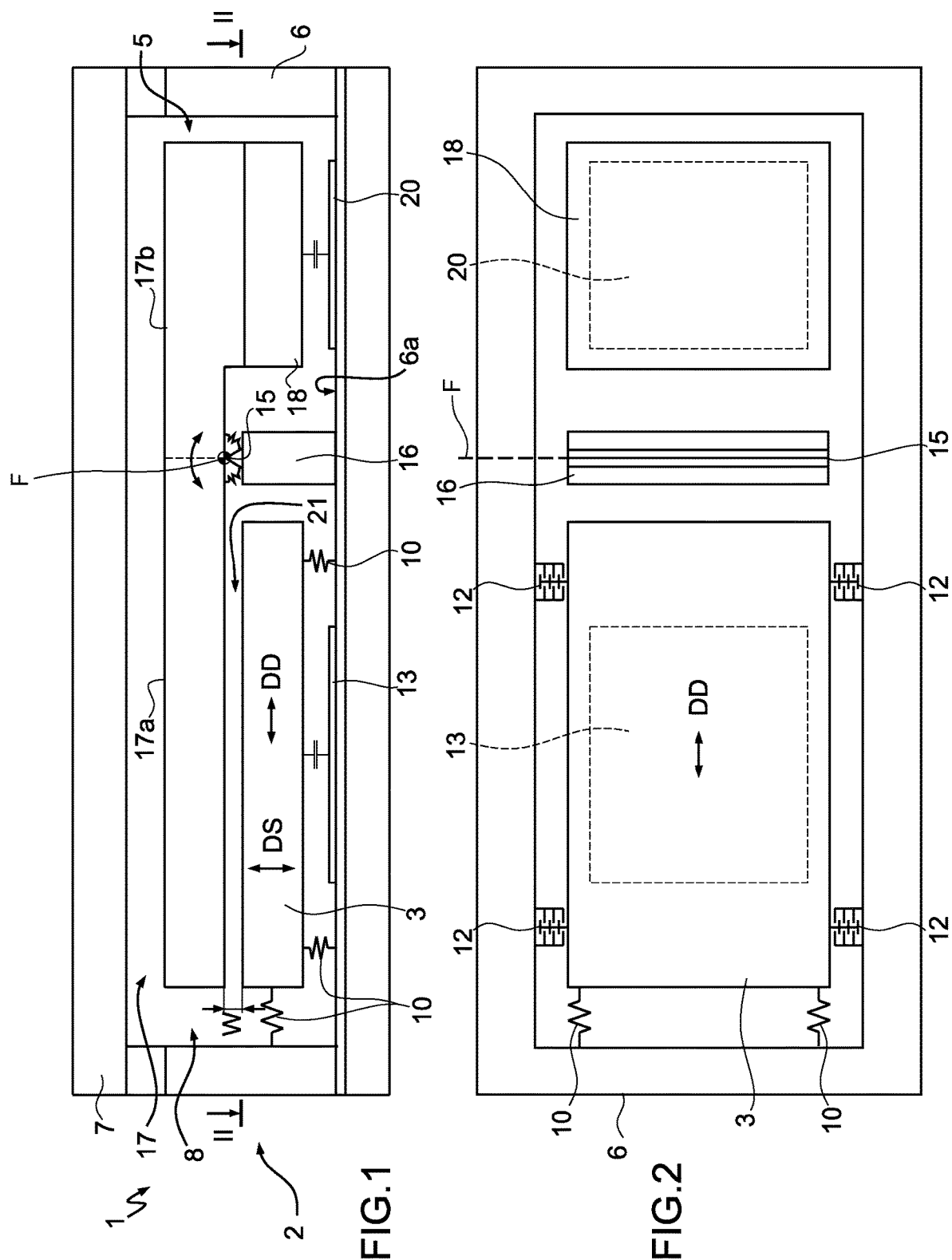

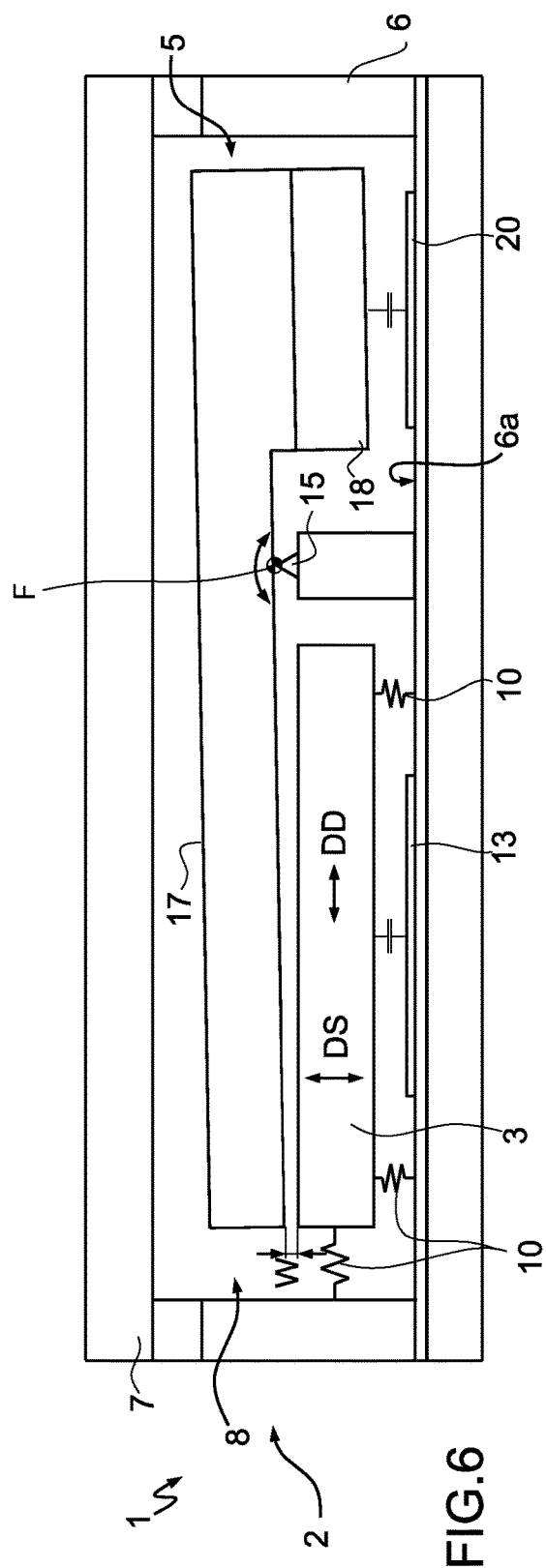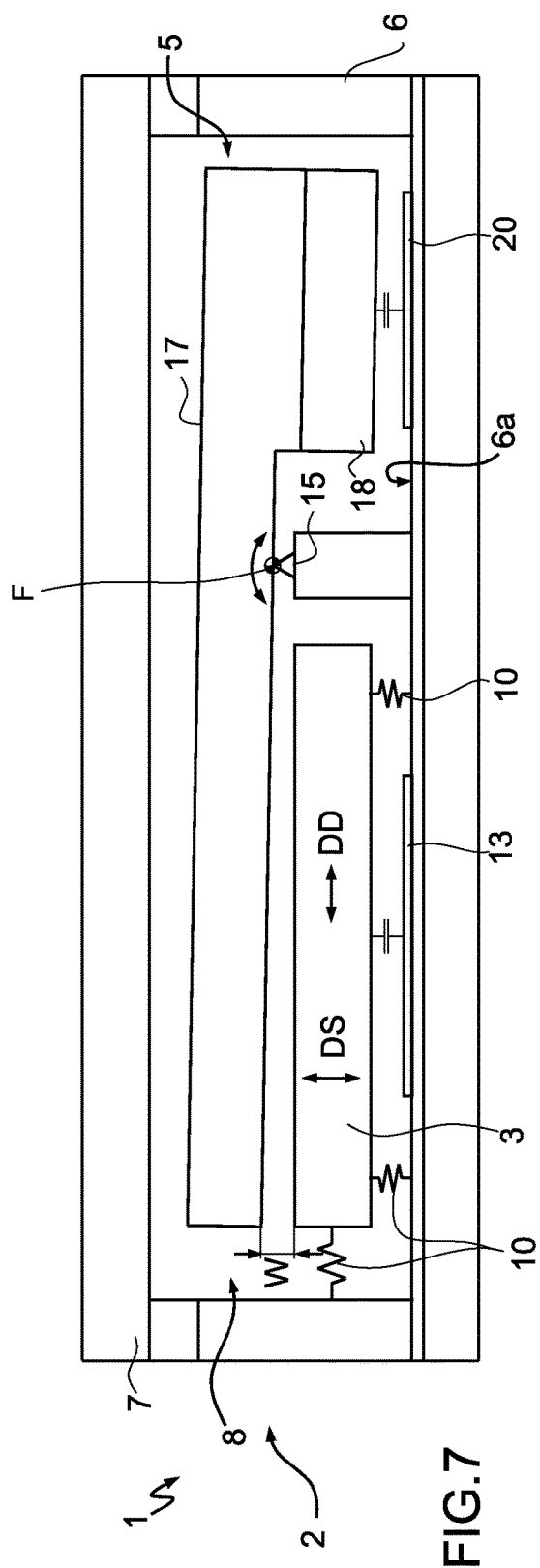

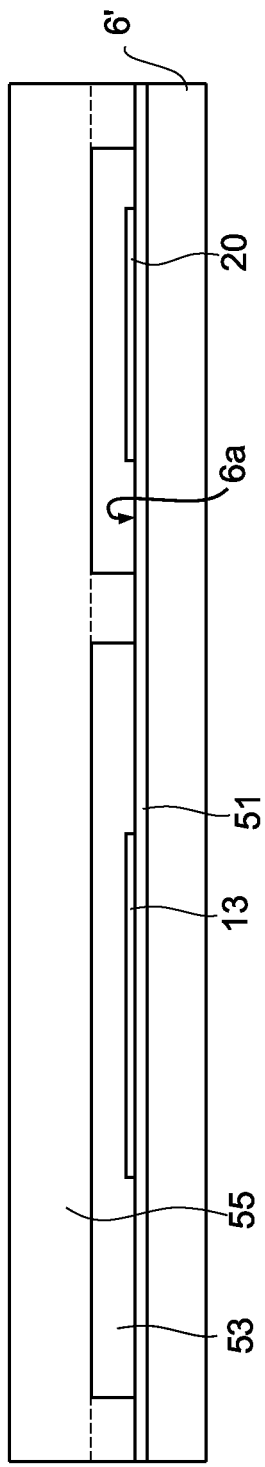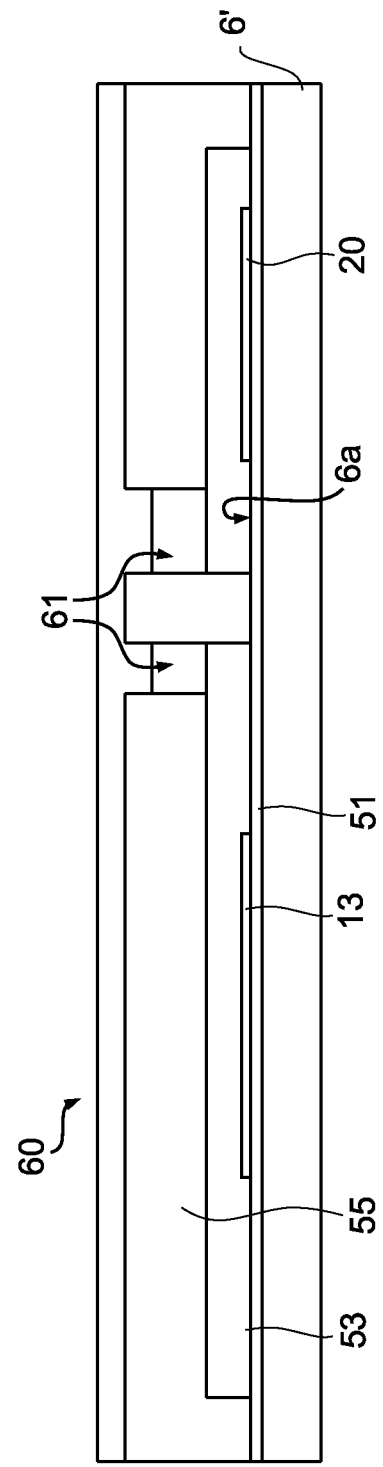

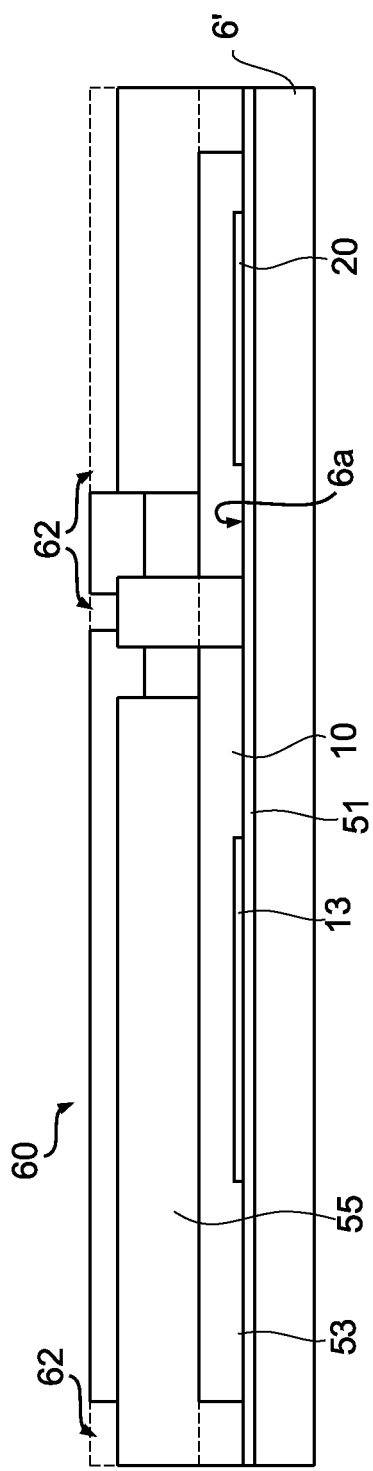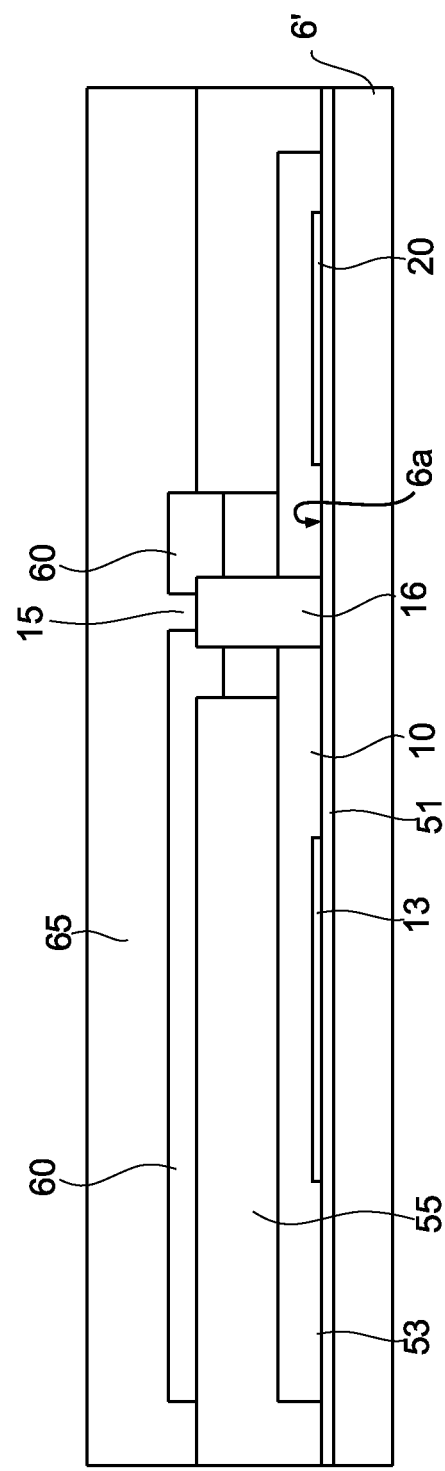

MICROELECTROMECHANICAL GYROSCOPE AND METHOD FOR COMPENSATING AN OUTPUT THERMAL DRIFT IN A MICROELECTROMECHANICAL GYROSCOPE

BACKGROUND

Technical Field

The present disclosure relates to a microelectromechanical gyroscope and to a method for compensating an output thermal drift in a microelectromechanical gyroscope.

Description of the Related Art

As is known, in microelectromechanical gyroscopes the stability of the zero rate output (ZRO) is a key parameter for the quality of performance and may be critical for very high accuracy.

The quadrature error is one of the dominant factors that determine the extent of the zero rate output (ZRO) in microelectromechanical gyroscopes. In short, the quadrature error is caused by imperfections that affect the output signals. Simplifying, a microelectromechanical gyroscope comprises a driving mass, constrained to a support structure to oscillate with (at least) one degree of freedom according to a driving direction, and a sensing mass, constrained to the driving mass to be dragged along the driving direction and to oscillate with respect to the driving mass with (at least) one degree of freedom according to a sensing direction, perpendicular to the driving direction. When the support structure rotates around a rotation axis perpendicular to the driving direction and to the sensing direction, the sensing mass is subject to a fictitious force in the sensing direction, dependent on the angular velocity and on the speed in the driving direction, due to dragging. The displacement of the sensing mass caused by the fictitious force is transduced into an electrical signal proportional to the angular velocity with respect to the rotation axis. According to other known solutions, a single movable mass is constrained to the support structure and may oscillate with a degree of freedom along the driving direction and with a degree of freedom along the sensing direction. Therefore, the mass acts as a driving mass and a sensing mass at the same time.

Due to unavoidable defects associated with the manufacturing of the connection elements between the support structure and the movable mass or movable masses, the driving direction is not perfectly perpendicular to the sensing direction. The result is a displacement in the sensing direction which is caused by the same driving motion and results in a quadrature noise signal component, which is phase-shifted by 90° with respect to the useful signal. This component is present even when the gyroscope is at rest and gives rise to an offset in the output signal. The amplitude and stability of the offset during the lifespan are key parameters for the new generation gyroscopes.

The quadrature error is also one of the factors that most affects the stability of the zero rate output, through dependence of the phase on the temperature.

In order to reduce the drift of the zero rate output, it is known to adopt some measures, which are not entirely satisfactory for several reasons.

A first known solution is the so-called family compensation. In practice, a same correction, determined on a statistical basis, is applied to all the gyroscopes of a family. The correction is carried out in a digital manner on the output, based on the quadrature estimated for the family and on the measured temperature. Although interesting because it is inexpensive, the solution is nevertheless not particularly accurate precisely because it is not individualized. Accordingly, devices whose parameters depart from the parameters of the devices used as a basis to determine the family compensation show a residual drift of the output.

A more accurate solution is the individual calibration of the gyroscopes, whereby a specific correction is determined and digitally applied for each device. The accuracy of the calibration is obviously higher, but the procedure is expensive and takes extremely long time.

According to a further known solution, a closed-loop dynamic compensation is carried out. The gyroscopes are provided with electrodes and sense circuits configured to sense the actual offset either continuously or by samples and with closed-loop compensation circuits that determine and apply a compensation signal to the output signal according to the sensed offset. The solution may be very accurate, it is capable of adapting the compensation to the actual conditions of the gyroscope and is also effective for the drifts that occur during the lifespan of the device. However, the used compensation circuits have a complex architecture and, in addition to being expensive in terms of production costs, are also expensive in terms of energy consumption, which is another fundamental parameter.

BRIEF SUMMARY

The present disclosure is directed to providing a microelectromechanical gyroscope and a method for compensating an output thermal drift in a microelectromechanical gyroscope which allow the described above limitations to be overcome or at least mitigated.

According to the present disclosure a microelectromechanical gyroscope and a method for compensating an output thermal drift in a microelectromechanical gyroscope.

In at least one embodiment, a microelectromechanical gyroscope includes a support structure. A sensing mass, coupled to the support structure with degrees of freedom along a driving direction and a sensing direction, the driving direction and the sensing direction are transverse to or perpendicular to each other. A calibration structure facing the sensing mass and separated from the sensing mass by a gap having an average width, the calibration structure being movable with respect to the sensing mass so that displacements of the calibration structure cause variations in the average width of the gap. A calibration actuator configured to control a relative position of the calibration structure with respect to the sensing mass and the average width of the gap.

In at least one embodiment, a method includes compensating an output thermal drift in a microelectromechanical gyroscope, including: arranging a calibration structure of the microelectromechanical gyroscope facing the sensing mass and separated from the sensing mass by a gap having an average width, and moving the calibration structure to vary the average width of the gap.

In at least one embodiment, a system includes a microelectromechanical gyroscope including: a support structure having a surface; a cap coupled to the support structure; a chamber delimited by the support structure and the cap; an anchor extending from the support structure into the chamber; a sensing mass coupled to the support structure by a plurality of flexures and overlying the surface of the support structure; a fulcrum coupled to an end of the anchor spaced apart from the surface of the support structure, the fulcrum having a fulcrum axis; a calibration structure coupled to the fulcrum, the calibration structure having: a calibration plate coupled to the fulcrum, the calibration plate having a first portion on a first side of the fulcrum axis and a second portion on a second side of the fulcrum axis, the first portion overlapping the sensing mass; a gap extending from the calibration plate to the to the sensing mass. A processing unit coupled to the microelectromechanical gyroscope.

BRIEF DESCRIPTION OF THE SEVERAL VIEWS OF THE DRAWINGS

For a better understanding of the disclosure, some embodiments thereof will now be described, purely by way of non-limiting example and with reference to the attached drawings, wherein:

FIG. 1 is a cross-section through a microelectromechanical gyroscope in accordance with an embodiment of the present disclosure;

FIG. 2 is a top plan view of the microelectromechanical gyroscope of FIG. 1, cut along line II-II of FIG. 1;

FIGS. 6 and 7 show the microelectromechanical gyroscope of FIG. 1 in a first operating configuration and in a second operating configuration, respectively;

FIGS. 8-13 are cross-sections through a semiconductor wafer in successive steps of a manufacturing process of the microelectromechanical gyroscope of FIG. 1;

DETAILED DESCRIPTION

Figure 3:
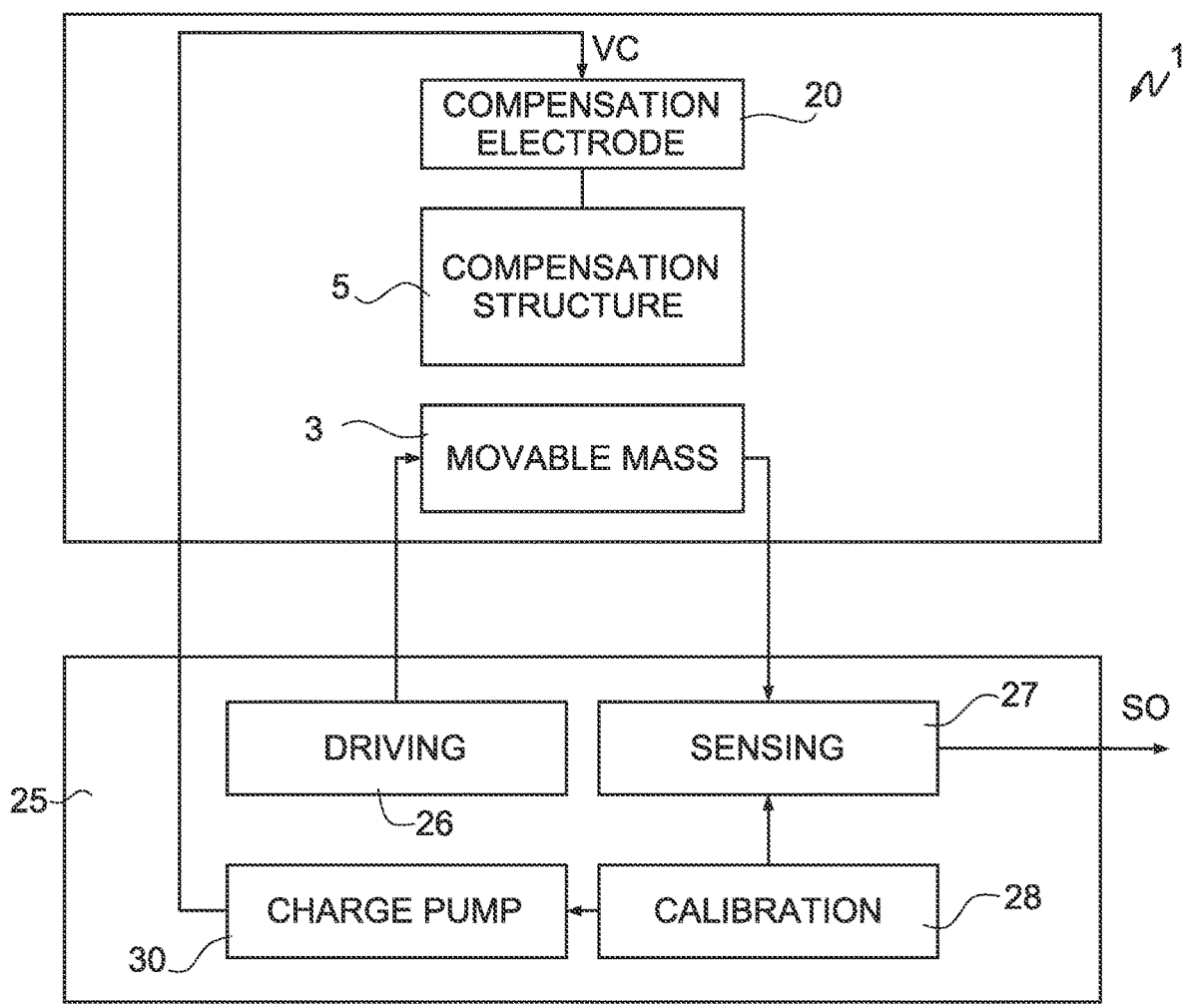
FIG. 3 is a simplified block diagram of the microelectromechanical gyroscope of FIG. 1.

With reference to FIG. 1, a microelectromechanical gyroscope in accordance with an embodiment of the present disclosure is schematically illustrated and indicated with the number 1 and comprises a packaging structure 2, a movable sensing mass 3 and a calibration structure 5.

The packaging structure 2 comprises a support structure 6 and a cap 7 joined together in a gas-tight manner and defining a hermetically closed and sealed chamber 8 between each other. A controlled atmosphere, for example low-pressure argon, is present in the chamber 8. The support structure 6 may be a single monolithic semiconductor body or include several layers, for example a monocrystalline substrate and one or more epitaxial layers connected to each other and to the substrate directly or through intermediate layers, such as dielectric, for example of silicon oxide, or conductive layers, such as layers of suitably doped polycrystalline silicon.

The sensing mass 3 and the calibration structure 5 are accommodated in the chamber 8. The support structure 6 and the cap 7 delimit the chamber 8, which may be referred to as a cavity.

The sensing mass 3 is of semiconductor material, for example monocrystalline epitaxial silicon, and is constrained to the support structure 6 through flexures 10. The flexures 10 are configured to allow the sensing mass 3 to oscillate with respect to the support structure 6 along a driving direction DD, parallel to a face 6a, which may be referred to as a surface, of the support structure 6, and along a sensing direction DS, transverse to or perpendicular to the face 6a and to the driving direction DD. Driving actuators 12 are operable to cause the sensing mass 3 to oscillate along the driving direction DD with controlled frequency and amplitude. For example, the driving actuators 12 may comprise electrode groups fixed to the support structure 6 and movable electrode groups fixed to the sensing mass 3, coupled in comb-fingered configuration.

The sensing mass 3, made conductive through doping, is capacitively coupled to a sensing electrode 13 arranged on the face 6a of the support structure 6 and facing the sensing mass 3.

The calibration structure 5 is connected to a fulcrum 15 fixed to the support structure 6 through an anchor 16 and may rotate around a fulcrum axis F parallel to the face 6a and transverse to or perpendicular to both the driving direction DD and the sensing direction DS. More in detail, the calibration structure 5 comprises a calibration plate 17 and a coupling mass 18 capacitively coupled to a calibration electrode 20 on the face 6a of the support structure 6. The calibration plate 17 and the coupling mass 18 are joined together to form a single rigid body. The fulcrum 15 is at an end of the anchor that is spaced apart from the face 6a of the support structure 6.

The calibration plate 17 is connected to the fulcrum 15 and has a first portion 17a and a second portion 17b opposite with respect to the fulcrum 15. In one embodiment, the calibration plate 17 is off-center with respect to the fulcrum 15, in such a way that the first portion 17a has a greater size than the second portion 17b. The first portion 17a faces the sensing mass 3 on the side opposite to the support structure 6 and is separated from the sensing mass 3 by a gap 21. The sensing mass 3 is therefore located between the sensing electrode 13 and the calibration structure 5 along the sensing direction DS. The average width W of the gap 21 is determined by the rest position of the sensing mass 3 and by the position of the calibration structure 5 as explained in detail hereinafter. The first portion 17a is on a first side of the fulcrum axis F and the second portion is on a second side of the fulcrum axis F when the calibration plate 17 is in the position as shown in FIG. 1.

The coupling mass 18 is capacitively coupled to the calibration electrode 20 and is therefore subject to an electrostatic force having sign and intensity dependent on the bias of the calibration electrode 20.

The gyroscope 1 is provided with a control unit 25, schematically illustrated in FIG. 3, which, inter alia, has the task of determining the bias of the calibration electrode 20. The control unit 25 comprises a driving device 26, configured to cause the sensing mass 3 to oscillate along the driving direction DD with controlled frequency and amplitude, a sensing device 27, configured to sense the displacements of the sensing mass 3, which is a movable mass, along the sensing direction DS and to convert the sensed displacements into an output signal SO indicative of the rotation speed of the gyroscope 1, a calibration module 28 and a charge pump 30. The calibration module 28 drives the charge pump 30, which is coupled to the calibration electrode 20 and sets a calibration voltage VC. In practice, therefore, the calibration electrode 20 and the charge pump 30 define a calibration actuator configured to control the relative position of the calibration structure 5 with respect to the sensing mass 3 and, in particular, the average width W of the gap 21.

Figure 4:
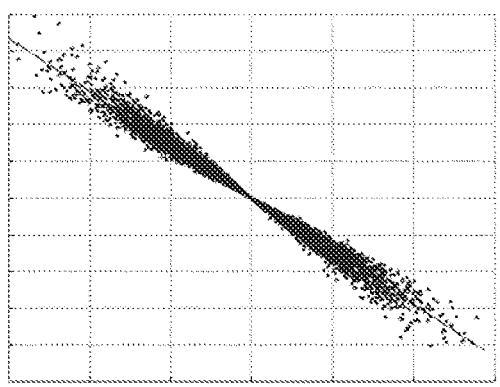
FIGS. 4 and 5 are graphs that show quantities relating to families of gyroscopes before and after a family calibration operation, respectively.
Figure 5:
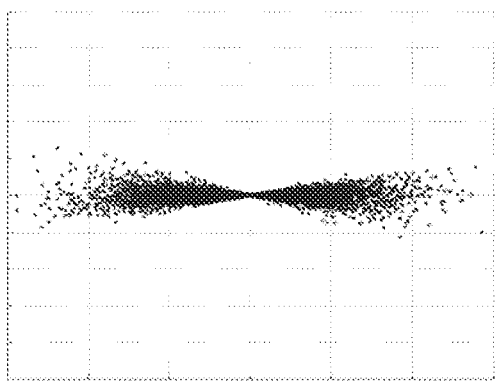

The compensation of the drift of the zero rate output of the gyroscope 1 due to the temperature occurs in the following manner. Initially, a family calibration, which in one embodiment is carried out by the calibration module 28 by acting on the sensing device 27 to modify the output signal SO, is applied. The family calibration is determined on a statistical basis by the observation of a sample of gyroscopes having identical structure to the gyroscope 1. An average error is determined from a distribution of the drift of the zero rate output of the sample (FIG. 4) and a corresponding correction is applied to all the gyroscopes of the family. The effect of the family calibration is illustrated in FIG. 5. The residual difference in temperature drift is due to the spread of the quality factor Q, which due to process imperfections varies from device to device. The quality factor Q is influenced by the mobility of gas molecules in the chamber 8, which, in turn, depends on the distance from surrounding masses. In the gyroscope 1, in particular, the quality factor Q is proportional to the square root of the average width W of the gap 21 between the sensing mass 3 and the first portion 17a of the calibration plate 17, that is of the portion of the calibration structure 5 facing the sensing mass 3 itself:

$$Q \propto \sqrt{W}$$

By acting on the calibration electrode 20, the electrostatic force applied to the calibration structure 5 may be modulated through the coupling mass 18 and therefore the amplitude of the gap 21 may be varied by modifying the quality factor Q accordingly to cancel or, in any case, substantially reduce the temperature drift of the output signal SO in absence of rotation, that is the zero rate output (ZRO). In particular, in the embodiment of FIG. 1 the modulation of the electrostatic force through the calibration electrode 20 allows the calibration structure 5 to be rotated counterclockwise, which may be referred to as a first rotation direction, to reduce the width W of the gap 21 and the quality factor Q and clockwise, which may be referred to as a second rotation direction that is opposite to the first rotation direction, to increase the width W of the gap 21 and the quality factor Q. The correction of the quality factor Q is extremely simple and quick to perform and may therefore be performed on each individual device without spending too much time to substantially cancel the offset on the output signal SO caused by the quadrature error. The control unit 25 may itself be provided with a calibration function, for example activatable on command or when certain stability conditions occur. In this manner, the calibration of the zero rate output may be carried out not only in the factory before use, but also subsequently during the lifespan of the device to eliminate components that may arise with aging, thermo-mechanical stress and, in general, environmental factors.

FIG. 6 shows the microelectromechanical gyroscope 1 of FIG. 1 in a first operating configuration. As shown in FIG. 6, the calibration plate 17 is in a first position when the microelectromechanical gyroscope 1 is in the first operating configuration. When in the first operating configuration, the calibration plate 17 has rotated in a counterclockwise direction such that the first portion 17a has rotated towards the sensing mass 3 and the second portion 17b has rotated away from the calibration electrode 20. When the calibration plate 17 is in the first position, the average width W decreases such that the average width W as shown in FIG. 6 is less than the average width W as shown in FIG. 1.

FIG. 7 shows the microelectromechanical gyroscope 1 of FIG. 1 in a second operating configuration different from the first operating configuration as shown in FIG. 6. As shown in FIG. 7, the calibration plate 17 is in a second position when the microelectromechanical gyroscope 1 is in the second operating configuration. When in the second operating configuration, the calibration plate 17 has rotated in the clockwise direction such that the first portion 17a has rotated away from the sensing mass 3 and the second portion 17b has rotated toward the calibration electrode 20. When the calibration plate 17 is in the second position, the average width W increases such that the average width W as shown in FIG. 7 is greater than the average width W as shown in FIG. 1.

As should be readily appreciated, the first position of the calibration plate 17 is different from the second position of the calibration plate. When the calibration plate 17 is in the first position as shown in FIG. 6, the first portion 17a of the calibration plate 17 is closer to the sensing mass 3 as compared to when the calibration plate 17 is in the second position as shown in FIG. 7. When the calibration plate 17 is in the first position, the second portion 17b of the calibration plate 17 is further away from the calibration electrode 20 as compared to when the calibration plate 17 is in the second position as shown in FIG. 7.

The gyroscope 1 of FIG. 1 may be formed through the process hereinafter described with reference to FIGS. 8-16. In practice, the sensing mass 3, the coupling mass 18 and the anchor 16 of the fulcrum 15 on one side and the calibration plate 17 on the other are obtained from two structural layers epitaxially grown one on the other, as described in detail hereinafter.

With reference to FIG. 8, a first dielectric layer 51, for example of silicon oxide, is grown on a substrate 6' of a wafer 50 of semiconductor material, for example monocrystalline silicon. A conductive layer (not shown), for example of polycrystalline silicon, is deposited on the first dielectric layer 51 and shaped to form the sensing electrode 13 and the calibration electrode 20. A first sacrificial layer 53, for example of thermally grown or deposited silicon oxide, is formed on the first dielectric layer 51, above the sensing electrode 13 and the calibration electrode 20. The first sacrificial layer 53 is selectively etched in positions corresponding to the anchor 16 and to perimeter (peripheral) portions of the support structure 6, which will be formed later. Then, a first epitaxial layer 55 is formed above the first sacrificial layer 53. The first epitaxial layer 55 has a thickness which is determined on the basis of the characteristics of the desired micro-electro-mechanical structures and may be comprised, for example, between 2 and 80 μm. After the epitaxial growth, the first epitaxial layer 55 is planarized and brought to the desired final thickness, for example through CMP (Chemical Mechanical Polishing).

The first epitaxial layer 55, FIG. 9, is etched to define bottom portions of the desired structures and of other intended regions. In particular, in this step the driving actuators 12 and the flexures 10 (not shown here) may be formed from the first epitaxial layer 55. Furthermore, portions of the first epitaxial layer 55 intended to form the sensing mass 3, the coupling mass 18 and the anchor 16 are separated from each other. To this end, the wafer 50 is covered by a resist mask (not shown), which may be referred to as a first trench mask, and subject to a dry etching, forming trenches 61, which completely pass through the first epitaxial layer 55. The etching stops automatically on the first sacrificial layer 53.

Then, a second sacrificial layer 60, for example of TEOS (TetraEthyl OrthoSilicate), is deposited for a thickness comprised, for example, between 1 and 2 μm. The second sacrificial layer 60 partially fills the trenches 61, for example for one third of their depth although this filling, as well as the filling extent and depth are not important. The second sacrificial layer 60 is then planarized.

The second sacrificial layer 60 is selectively etched and removed, using a masking layer (not shown), which may be referred to as a second anchor mask to form openings 62, as illustrated in FIG. 10. The etching of the second sacrificial layer 60 automatically terminates on the first epitaxial layer 55. In general, the second anchor openings 62 are formed in the zones where forming connection regions between the first epitaxial layer 55 and a second epitaxial layer which will be formed later is desired. In particular, here, the second anchor openings 62 are formed in positions corresponding to the fulcrum 15, to a junction zone between the coupling mass 18 and the calibration plate 17 and to perimeter portions of the wafer 50.

Subsequently, FIG. 11, a second epitaxial layer 65 is grown, for a thickness also here linked to the desired micro-electro-mechanical structures, and which may be comprised also here between 2 and 80 μm. In general, the second epitaxial layer 65 may be thinner than the first epitaxial layer 55, although the opposite may occur and the disclosure is not limited to any particular ratio between the thicknesses of the epitaxial layers 55, 65.

After the epitaxial growth, the second epitaxial layer 65 is planarized and brought to the desired final thickness, for example through CMP (Chemical Mechanical Polishing). In this manner, the structural layer formed by the first and the second epitaxial layers 55, 65, also referred to as overall epitaxial layer, reaches a final thickness, typically variable between 20 and 80 μm.

Figure 12:
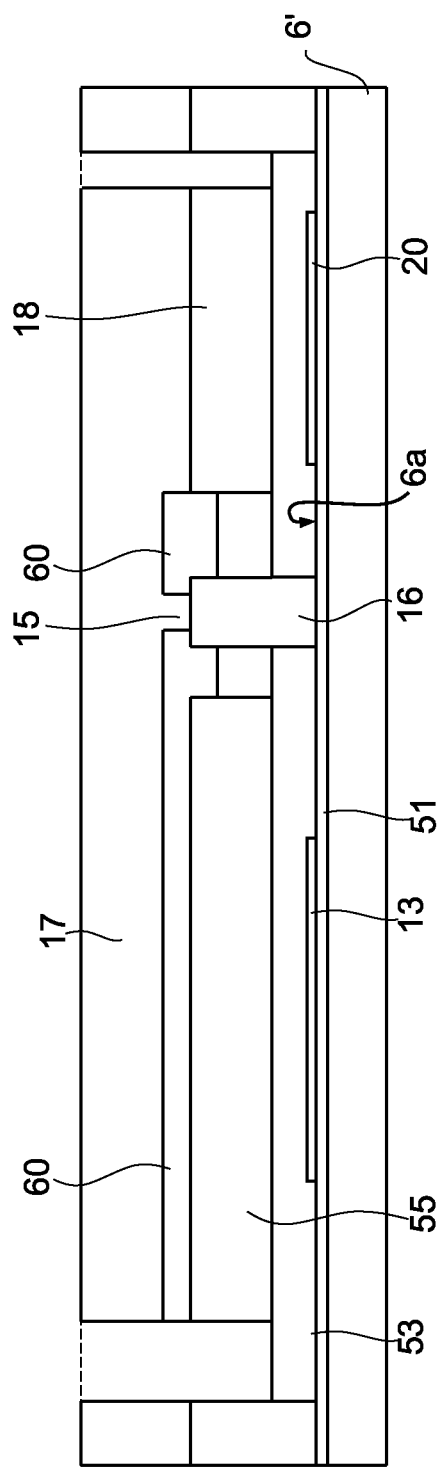

The wafer 50 is etched as shown in FIG. 12. To this end, the wafer 50 is covered by a resist mask (not shown) and subject to a dry etching. In this step, the portions of the epitaxial layers 55, 65 not covered by the second trench mask are removed for the entire thickness of the overall epitaxial layer and the etching stops on the first sacrificial layer 53.

In particular, in this step the sensing mass 3, the calibration plate 17 and the coupling mass 18 are defined.

Figure 13:
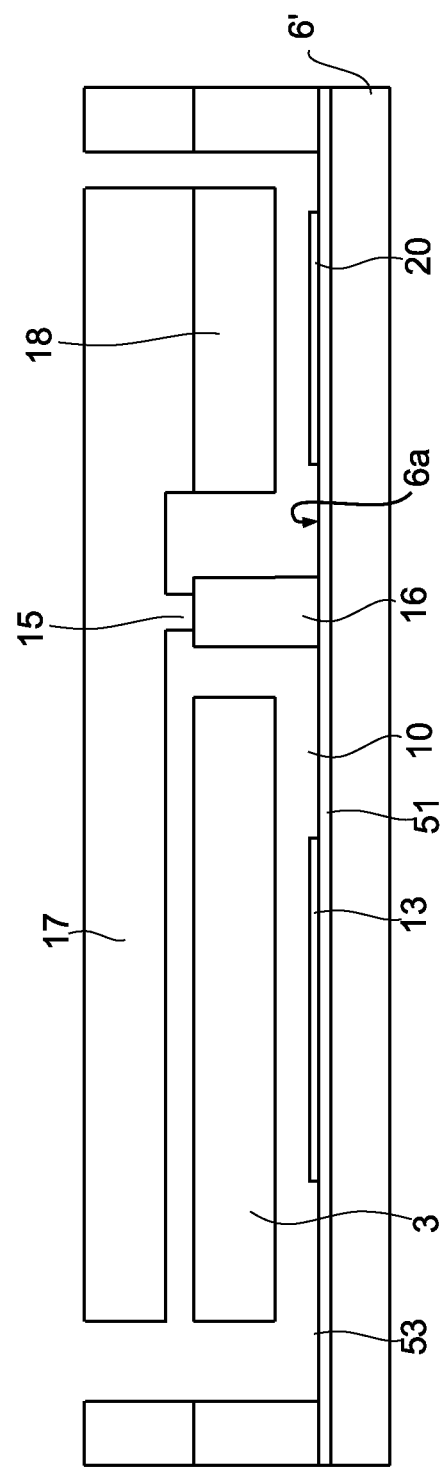

Then, FIG. 13, the residual portions of the second sacrificial layer 60 and the first sacrificial layer 53 are removed, releasing the movable mass and the calibration structure 5.

Finally, a cap wafer (not shown), which corresponds to the cap 7, is bonded to the wafer 50 through an adhesive layer and the composite wafer thus obtained is diced to form the gyroscope 1 of FIG. 1. The perimeter portions of the epitaxial layers 55, 65 in each die form, with the respective portion of the substrate 6', the support structure 6 of the gyroscope 1.

Figure 15:
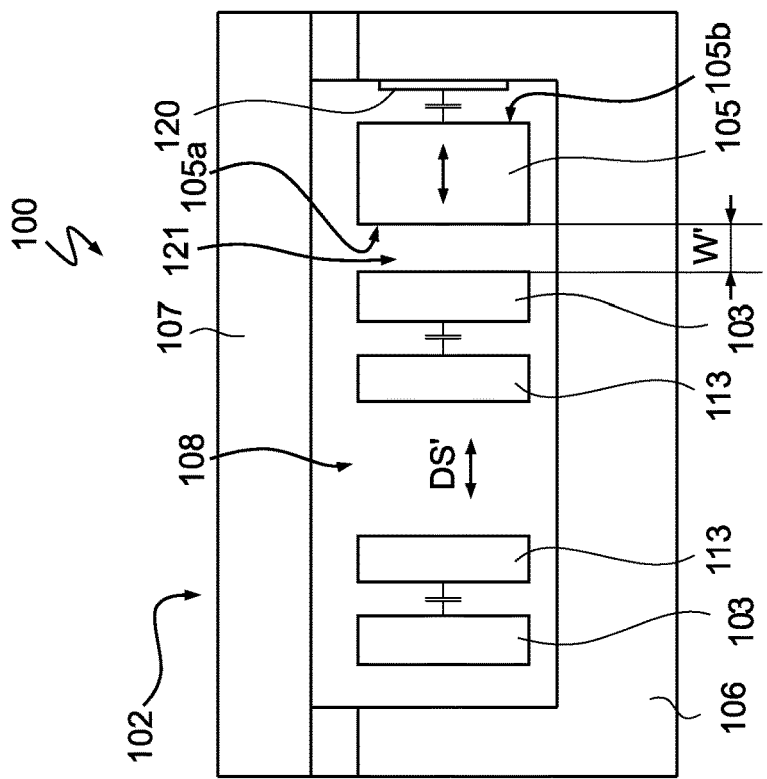
FIG. 15 is a front view of the microelectromechanical gyroscope of FIG. 14, cut along line XV-XV of FIG. 14.
Figure 14:
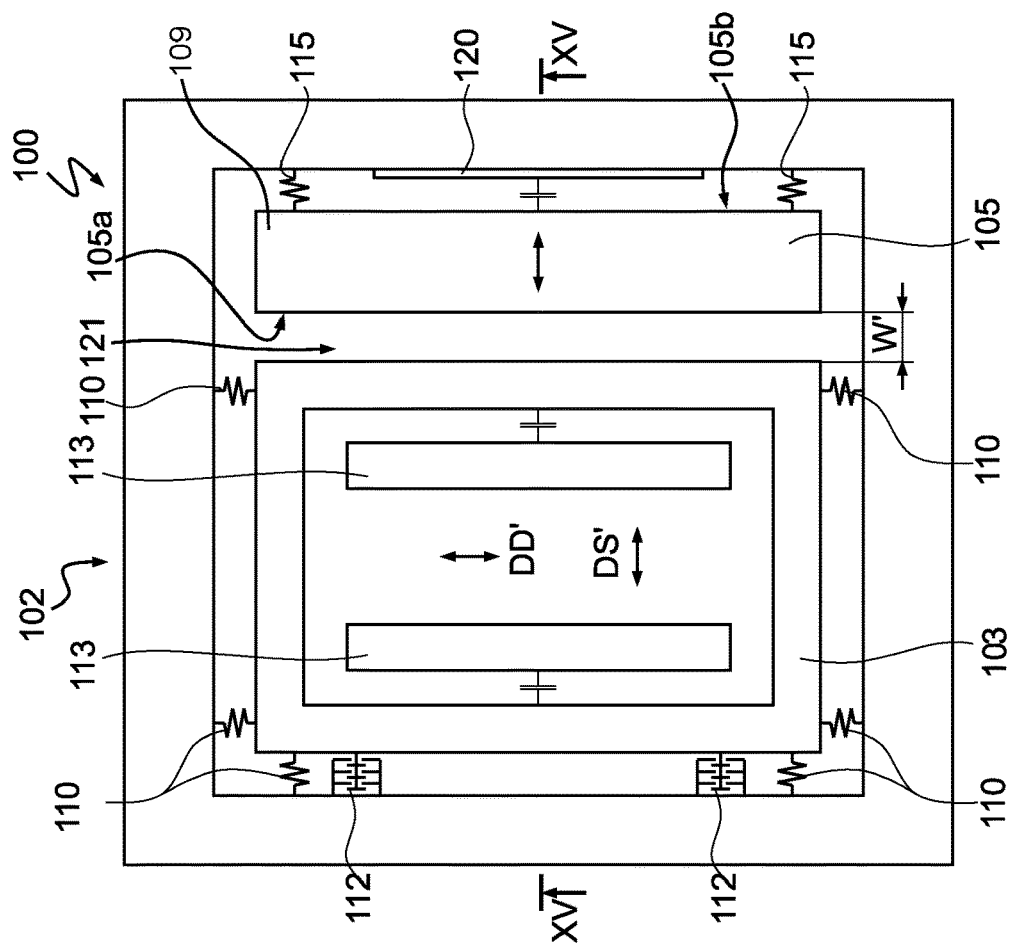
FIG. 14 is a top plan view, with parts removed for sake of clarity, of a microelectromechanical gyroscope in accordance with a different embodiment of the present disclosure.

With reference to FIGS. 14 and 15, a microelectromechanical gyroscope 100 in accordance with an embodiment of the present disclosure comprises a packaging structure 102, a sensing mass 103 and a calibration structure 105. The packaging structure 102 comprises a support structure 106 and a cap 107 joined together or coupled together in a gas-tight manner and defining a hermetically closed chamber 108 between each other wherein a controlled atmosphere, for example low-pressure argon, is present.

The sensing mass 103 and the calibration structure 105 are accommodated in the chamber 108. The support structure 106 and the cap 107 delimit the chamber 108, which may be referred to as a cavity.

The sensing mass 103, of semiconductor material, is frame-shaped and is constrained to the support structure 106 through flexures 110. The flexures 110 are configured to allow the sensing mass 103 to oscillate with respect to the support structure 106 along a driving direction DD' and along a sensing direction DS', both parallel to a face 106a of the support structure 106, and transverse to or perpendicular to each other. Driving actuators 112 are operable to cause the sensing mass 103 to oscillate along the driving direction DD' with controlled frequency and amplitude.

Sensing electrodes 113 fixed to the support structure 106 face and are capacitively coupled to respective sides of the sensing mass 103. In one embodiment, the sensing electrodes 113 are arranged inside the frame structure of the sensing mass 103.

The calibration structure 105 is defined by a mass 109 connected to the support structure 106 through flexures 115 which allow movements along the sensing direction DS'. The calibration structure 105 has a first side 105a facing one side of the sensing mass 103 and separated from the sensing mass 103 by a gap 121. The average width W' of the gap 121 is determined by the rest position of the sensing mass 103 and by the position of the calibration structure 105. Furthermore, the calibration structure 105 is capacitively coupled to a calibration electrode 120 arranged on the support structure 106 and facing a second side 105b of the calibration structure 105 opposite to the first side 105a. The calibration electrode 120 may be used in combination with the charge pump 30 of FIG. 3 to form a calibration actuator controlled by the calibration module 28. The calibration structure 105 is therefore subject to an electrostatic force of intensity dependent on the bias of the calibration electrode 120. By acting on the calibration electrode 120, the electrostatic force applied to the calibration structure 105 may be modulated and therefore the amplitude of the gap 121 may be modified by modifying the quality factor Q accordingly to cancel or, in any case, substantially reduce the temperature drift of the zero rate output. In particular, in the embodiment of FIGS. 14 and 15, the calibration structure 105 may be moved closer to the sensing mass 103 to reduce the width W' of the gap 121 and the quality factor Q and moved away from the sensing mass 103 to reduce the width W' of the gap 121 and the quality factor Q.

Figure 17:
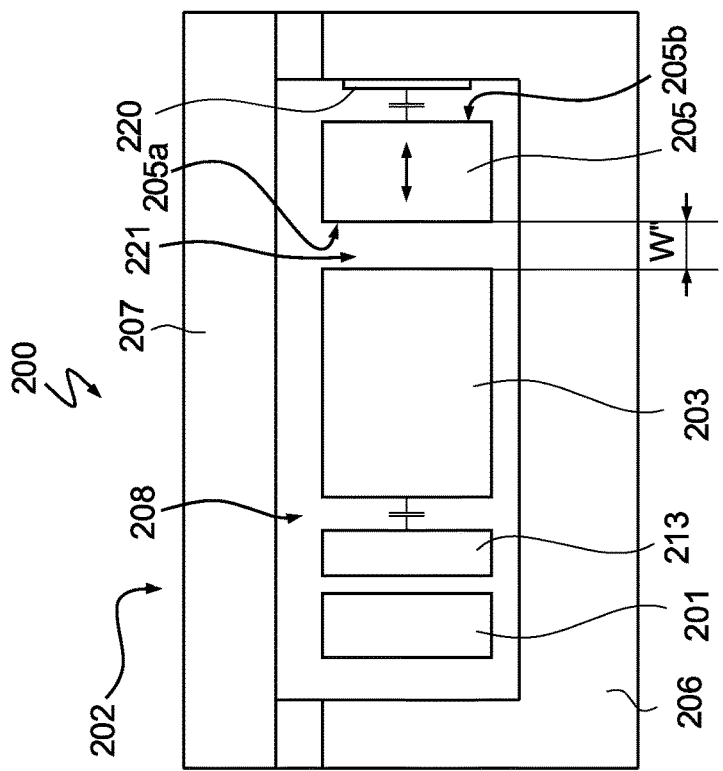
FIG. 17 is a front view of the microelectromechanical gyroscope of FIG. 16, cut along line XVII-XVII of FIG. 16.
Figure 16:
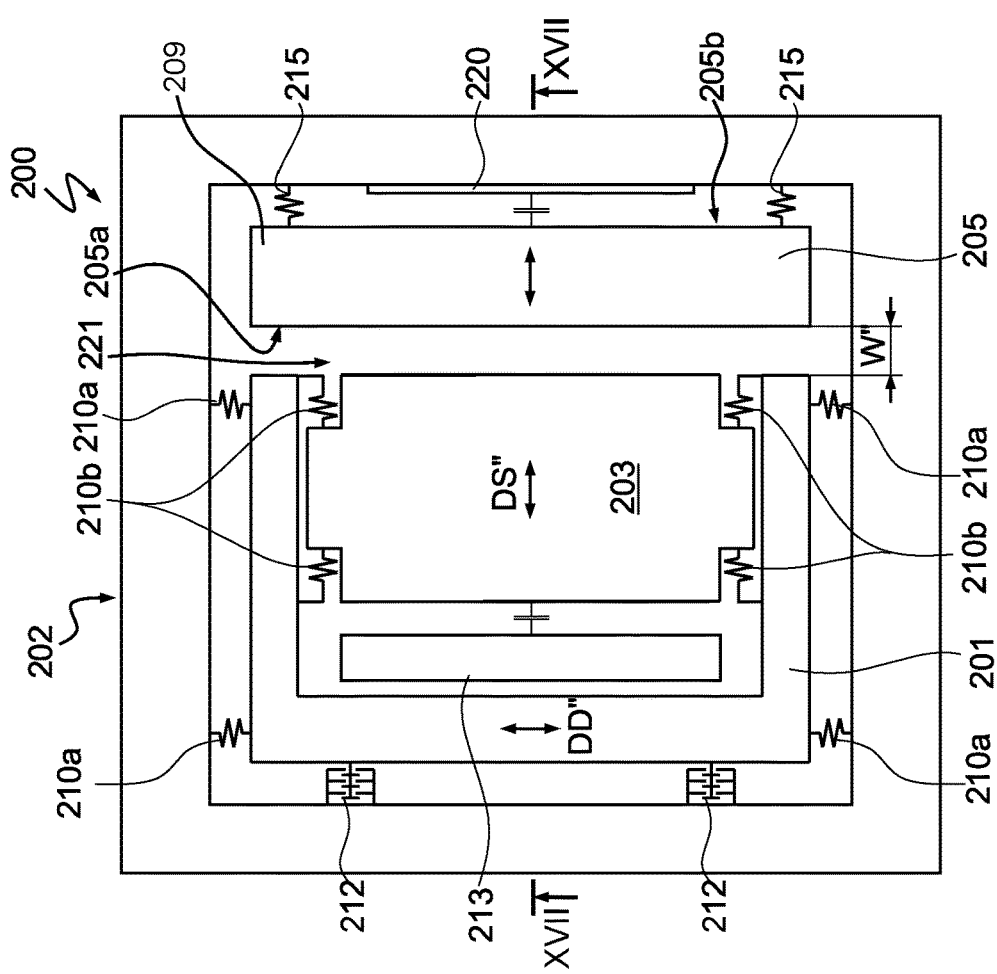
FIG. 16 is a top plan view, with parts removed for sake of clarity, of a microelectromechanical gyroscope in accordance with a further embodiment of the present disclosure.

With reference to FIGS. 16 and 17, a microelectromechanical gyroscope 200 in accordance with an embodiment of the present disclosure comprises a packaging structure 202, a driving mass 201, a sensing mass 203 and a calibration structure 205. The packaging structure 202 comprises a support structure 206 and a cap 207 joined together or coupled together in a gas-tight manner and defining a hermetically closed chamber 108 between each other wherein a controlled atmosphere, for example low-pressure argon, is present.

The driving mass 201, the sensing mass 203 and the calibration structure 205 are accommodated in the chamber 208. The support structure 206 and the cap 207 delimit the chamber 208, which may be referred to as a cavity.

The driving mass 201, of semiconductor material, is C-shaped and is constrained to the support structure 206 through flexures 210a. The flexures 210a are configured to allow the driving mass 201 to oscillate with respect to the support structure 206 along a driving direction DD" parallel to a face 206a of the support structure 206 itself. Driving actuators 212 are operable to cause the driving mass 201 to oscillate along the driving direction DD" with controlled frequency and amplitude.

The sensing mass 203, also of semiconductor material, is accommodated inside the driving mass 201 and faces the open side and is constrained to the driving mass 201 through flexures 210b. The flexures 210b are configured to allow the sensing mass 203 to oscillate with respect to the driving mass 201 and therefore with respect to the support structure 206 along a sensing direction DS", parallel to the face 206a of the support structure 206 and transverse to or perpendicular to the driving direction DD".

A sensing electrode 213 fixed to the support structure 206 faces and is capacitively coupled to one side of the sensing mass 203. In one embodiment, the sensing electrode 213 is arranged between the sensing mass 203 and the closed side of the C-shaped sensing mass 203.

The calibration structure 205 is defined by a mass 209 connected to the support structure 206 through flexures 215 which allow movements along the sensing direction D". The calibration structure 205 has a first side 205a facing one side of the sensing mass 203 and separated from the sensing mass 203 by a gap 221. The average width W" of the gap 221 is determined by the rest position of the driving mass 201 and by the position of the calibration structure 205. Furthermore, the calibration structure 205 is capacitively coupled to a calibration electrode 220 arranged on the support structure 206 and facing a second side 205b of the calibration structure 205 opposite to the first side 205a. The calibration electrode 220 may be used in combination with the charge pump 30 of FIG. 3 to form a calibration actuator controlled by the calibration module 28. Also in this case, by acting on the calibration electrode 220, the amplitude of the gap 221 may be modified by modifying the quality factor Q accordingly to cancel or, in any case, substantially reduce the temperature drift of the zero rate output.

Figure 18:
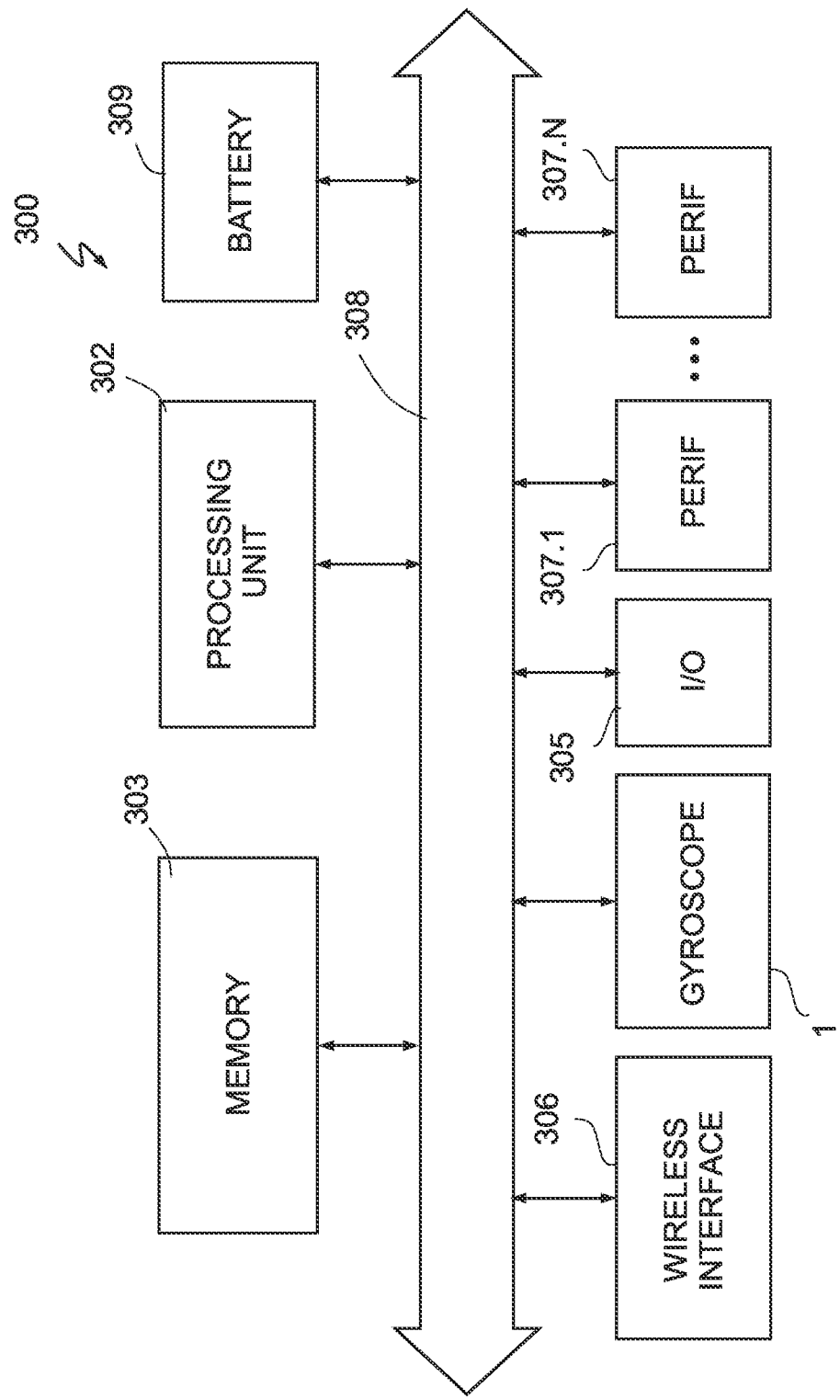
FIG. 18 is a simplified block diagram of an electronic system incorporating a microelectromechanical gyroscope according to the present disclosure.

FIG. 18 shows an electronic system 300 which may be of any type, in particular, but not limited to, a wearable device, such as a watch, a smart bracelet or band; a computer, such as a mainframe, a personal computer, a laptop or a tablet; a smartphone; a digital music player, a digital camera or any other device for processing, storing, transmitting or receiving information. The electronic system 300 may be a general purpose or device embedded processing system, an equipment or a further system.

The electronic system 300 comprises a processing unit 302, memory devices 303, a microelectromechanical gyroscope according to the disclosure, for example the microelectromechanical gyroscope 1 of FIG. 1, and may also be provided with input/output (I/O) devices 305 (e.g., a keyboard, a pointer, a touch screen, or some other suitable type of input or interface device), a wireless interface 306, peripherals 307.1, . . . , 307.N and possibly further auxiliary devices, not shown here. The components of the electronic system 300 may be coupled in communication with each other directly and/or indirectly through a bus 308. The electronic system 300 may further comprise a battery 309. It should be noted that the scope of the present disclosure is not limited to embodiments necessarily having one or all the listed devices.

The processing unit 302 may comprise, for example, one or more microprocessors, microcontrollers and the like, according to the design preferences. The processing unit 302 may comprise, for example, one or more processors, controllers and the like.

The memory devices 303 may comprise volatile memory devices and non-volatile memory devices of various kinds, for example SRAM and/or DRAM memories for the volatile-type and solid state memories, magnetic disks and/or optical disks for the non-volatile-type.

Finally, it is apparent that modifications and variations may be made to the microelectromechanical gyroscope and to the method described, without departing from the scope of the present disclosure, as defined in the attached claims.

A microelectromechanical gyroscope may be summarized as including a support structure (6; 106; 206); a sensing mass (3; 103; 203), coupled to the support structure (6; 106; 206) with degrees of freedom along a driving direction (DD; DD; DD") and a sensing direction (DS; DS; DS") perpendicular to each other; a calibration structure (5; 105; 205) facing the sensing mass (3; 103; 203) and separated from the sensing mass (3; 103; 203) by a gap (21; 121; 221) having an average width (W; W; W"), the calibration structure (5; 105; 205) being movable with respect to the sensing mass (3; 103; 203) so that displacements of the calibration structure (5; 105; 205) cause variations in the average width (W; W; W") of the gap (21; 121; 221); a calibration actuator (20, 30; 120, 30; 220, 30) configured to control a relative position of the calibration structure (5; 105; 205) with respect to the sensing mass (3; 103; 203) and the average width (W; W; W") of the gap (21; 121; 221).

The calibration actuator (20, 30; 120, 30; 220, 30) may include a calibration electrode (20; 120; 220), arranged on the support structure (6; 106; 206) and capacitively coupled to the calibration structure (5; 105; 205), and a bias source (30) coupled to the calibration electrode (20; 120; 220).

The driving direction (DD) may be parallel to a face (6a) of the support structure (6) and the sensing direction (DS) may be perpendicular to the face (6a) and to the driving direction (DD) and the calibration structure (5) may be connected to a fulcrum (15) fixed to the support structure (6) and may be rotatable around a fulcrum axis (F) parallel to the face (6a) and perpendicular to both the driving direction (DD) and the sensing direction (DS).

The calibration structure (5) may include a calibration plate (17) coupled to the fulcrum (15) and may have a first portion (17a) and a second portion (17b) opposite with respect to the fulcrum (15); the first portion (17a) faces the sensing mass (3) on one side of the sensing mass (3) opposite to the support structure (6) and may be separated from the sensing mass (3) by the gap (21).

The calibration structure (5) may include a coupling mass (18) rigidly joined to the second portion (17b) of the calibration plate (17) and capacitively coupled to the calibration electrode (20).

The gyroscope may include at least one sensing electrode (13) arranged on the face (6a) of the support structure (6) and facing and capacitively coupled to the sensing mass (3) and wherein the sensing mass (3) may be arranged between the sensing electrode (13) and the calibration structure (5) along the sensing direction (DS).

The driving direction (DD; DD") and the sensing direction (DS; DS") may both be parallel to a face (106a; 206a) of the support structure (106; 206a).

The calibration structure (105; 206) may have a first side (105a; 205a) facing one side of the sensing mass (103; 203) and separated from the sensing mass (103; 203) by the gap (121; 221) and the calibration electrode (120; 220) faces a second side (105b; 205b) of the calibration structure (105; 205) opposite to the first side (105a; 205a).

The calibration structure (105; 205) may be movable with respect to the sensing mass (103; 203) along the sensing direction (DS; DS").

The gyroscope may include at least one sensing electrode (113; 213) fixed to the support structure (106; 206) wherein the sensing mass (103; 203) may be frame-shaped and the sensing electrode (113; 213) may be capacitively coupled to a respective side of the sensing mass (103; 203).

The sensing electrode (113; 213) may be arranged inside the sensing mass (102; 203).

The gyroscope may include a driving mass (201), movable with respect to the support structure (206) along the driving direction (DD") the sensing mass (203) may be constrained to the driving mass (201) to be dragged by the driving mass in the driving direction (DD") and movable with respect to the driving mass (201) along the sensing direction (DS").

The gyroscope may include a cap (7; 107; 207) joined to the support structure (6; 106; 206) in a gas-tight manner to form a chamber (8; 108; 208) hermetically closed between the cap (7; 107; 207) and the support structure (6; 106; 206) wherein the sensing mass (3; 103; 203) and the calibration structure (5; 105; 205) may be accommodated inside the chamber (8; 108; 208).

An electronic system may be summarized as including a processing unit (402) and a gyroscope (1; 100; 200).

A method for compensating an output thermal drift in a microelectromechanical gyroscope, the microelectromechanical gyroscope may be summarized as including a support structure (6; 106; 206) and a sensing mass (3; 103; 203), coupled to the support structure (6; 106; 206) with degrees of freedom along a driving direction (DD; DD; DD") and a sensing direction (DS; DS; DS") perpendicular to each other; and a calibration structure (5; 105; 205) facing the sensing mass (3; 103; 203) and separated from the sensing mass (3; 103; 203) by a gap (21; 121; 221) having an average width (W; W; W"); the method including arranging a calibration structure (5; 105; 205) facing the sensing mass (3; 103; 203) and separated from the sensing mass (3; 103; 203) by a gap (21; 121; 221) having an average width (W; W; W"); and moving the calibration structure (5; 105; 205) to vary the average width (W; W; W") of the gap (21; 121; 221).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a support structure having a surface;
an anchor extending from the support structure;
a sensing mass coupled to the support structure by one or more flexures and overlying the surface of the support structure;
a fulcrum coupled to an end of the anchor spaced apart from the surface of the support structure;
a calibration structure having a calibration plate coupled to the fulcrum and overlapping the sensing mass; and
a gap extending from the calibration plate to the sensing mass.

2. The device of claim 1, wherein:
the fulcrum has a fulcrum axis; and
the calibration plate having a first portion on a first side of the fulcrum axis and a second portion on a second side of the fulcrum axis.

3. The device of claim 2, further comprising a coupling mass coupled to the second portion of the calibration plate.

4. The device of claim 3, further comprising a calibration electrode on the surface of the support structure and overlapped by the coupling mass.

5. The device of claim 1, wherein the calibration plate is configured to rotate about a fulcrum axis in a first rotation direction towards a first operation configuration and to rotate about the fulcrum axis in a second rotation direction towards a second operation configuration different from the first operation configuration, the second rotation direction being opposite to the first rotation direction.

6. The device of claim 1, wherein a cap is coupled to the support structure.

7. The device of claim 6, wherein:
the cap and the support structure delimit a chamber; and
the anchor, the sensing mass, the fulcrum, the calibration structure, and the gap are within the chamber.

8. A device, comprising:
a support structure;
a sensing mass coupled to the support structure with degrees of freedom;
a calibration structure facing the sensing mass and separated by the sensing mass by a gap, the calibration structure being movable with respect to sensing mass; and
a calibration actuator configured to, in operation, control a relative position of the calibration structure with respect to the sensing mass.

9. The device of claim 8, wherein the calibration actuator includes:
a calibration electrode on the support structure and capacitively coupled to the calibration structure; and
a bias source coupled to the calibration structure.

10. The device of claim 8, wherein the calibration structure includes a calibration plate coupled to a fulcrum, which has a fulcrum axis, at an end of an anchor extending from the support structure, the calibration structure including a first portion on a first side of the fulcrum axis and a second portion on a second side of the fulcrum axis opposite to the first side.

11. The device of claim 10, wherein the calibration structure further includes a coupling mass coupled to the second portion of the calibration plate and capacitively coupled to a calibration electrode of the calibration actuator.

12. The device of claim 8, further comprising a sensing electrode capacitively coupled to the sensing mass.

13. A method, comprising:
forming one or more first trenches extending into a first layer of a wafer to a first sacrificial layer of the wafer;
forming a second sacrificial layer on the first layer;
forming one or more openings in the second sacrificial layer exposing regions of the first layer;
filling the one or more openings and covering the second sacrificial layer by forming a second layer on the regions of the first layer exposed by the one or more openings and on the second sacrificial layer;
forming one or more second trenches extending into the second layer, the second sacrificial layer, and the first layer and extending to the first sacrificial layer; and
removing the first sacrificial layer and the second sacrificial layer releasing a sensing mass of the first layer and a calibration structure of the first and second layer.

14. The method of claim 13, wherein forming the one or more first trenches includes etching the first layer of the wafer.

15. The method of claim 13, wherein forming the second sacrificial layer on the first layer includes forming the second sacrificial layer extending over the one or more first trenches.

16. The method of claim 15, wherein forming the second sacrificial layer on the first layer includes partially filling the one or more first trenches with the second sacrificial layer.

17. The method of claim 13, wherein forming the one or more first trenches defines an anchor of the first layer.

18. The method of claim 13, wherein removing the first sacrificial layer exposes one or more electrodes of the wafer previously covered by the first sacrificial layer.

19. The method of claim 13, wherein filling the one or more openings and covering the second sacrificial layer by forming the second layer on the regions of the first layer further includes defining a fulcrum of the second layer.

20. The method of claim 13, further comprising forming a chamber containing the calibration structure by coupling a cap to a support structure of the wafer.

\* \* \* \* \*